US012669651B2

(12) United States Patent　　　　(10) Patent No.: US 12,669,651 B2
Benabid et al.　　　　　　　　　　　　(45) Date of Patent: Jun. 30, 2026

(54) COUPLING DEVICE FOR COUPLING HOLLOW-CORE OPTICAL FIBRES COMPRISING A COUPLING ELEMENT

(71) Applicants: THALES, Meudon (FR); UNIVERSITE DE LIMOGES, Limoges (FR); CENTRE NATIONAL DE LA RECHERCHE SCIENTIFIQUE, Paris (FR); GLOPHOTONICS, Limoges (FR)

(72) Inventors: Abdelfatah Benabid, Limoges (FR); Benoît Debord, Limoges (FR); Benoît Beaudou, Limoges (FR); Gilles Feugnet, Palaiseau (FR); Bertrand Morbieu, Tours (FR)

(73) Assignees: THALES, Meudon (FR); UNIVERSITE DE LIMOGES, Limoges (FR); CENTRE NATIONAL DE LA RECHERCHE SCIENTIFIQUE, Paris (FR); GLOPHOTONICS, Limoges (FR)

( * ) Notice: Subject to any disclaimer, the term of this patent is extended or adjusted under 35 U.S.C. 154(b) by 283 days.

(21) Appl. No.: 18/577,211

(22) PCT Filed: Jul. 7, 2022

(86) PCT No.: PCT/EP2022/068978
§ 371 (c)(1),
(2) Date: Jan. 5, 2024

(87) PCT Pub. No.: WO2023/281010
PCT Pub. Date: Jan. 12, 2023

(65) Prior Publication Data
US 2024/0319445 A1　　Sep. 26, 2024

(30) Foreign Application Priority Data
Jul. 8, 2021　(FR) ...................................... 2107433

(51) Int. Cl.
*G02B 6/28*　　　(2006.01)
*G02B 6/02*　　　(2006.01)

(52) U.S. Cl.
CPC ....... *G02B 6/2821* (2013.01); *G02B 6/02328* (2013.01)

(58) Field of Classification Search
CPC .......................... G02B 6/02328; G02B 6/2821
See application file for complete search history.

(56) References Cited

U.S. PATENT DOCUMENTS

| | | | | |
|---|---|---|---|---|
| 7,113,681 B2 * | 9/2006 | Fleming | ............. | G02B 6/02361 |
| | | | | 385/127 |
| 9,348,090 B2 * | 5/2016 | Sasaoka | ............... | G02B 6/3885 |
(Continued)

FOREIGN PATENT DOCUMENTS

| | | |
|---|---|---|
| CN | 108 549 128 A | 9/2018 |
| CN | 111 796 364 A | 10/2020 |
(Continued)

OTHER PUBLICATIONS

Xu, et al., "Design of single-polarization coupler based on dual-core photonic band-gap fiber implied in resonant fiber optic gyro", Optics Communications, vol. 380, pp. 302-309, 2016.
(Continued)

*Primary Examiner* — Rhonda S Peace
(74) *Attorney, Agent, or Firm* — Baker Hostetler

(57) ABSTRACT
A device for coupling optical fibers, includes a first coupling-inhibited hollow-core optical fiber comprising a first microstructured cladding comprising a plurality of first confining tubular features distributed in a ring and encircling, at least partially, a first core so as to confine at least radiation at a wavelength λop to the first core, a second coupling-inhibited hollow-core optical fiber comprising a second microstructured cladding comprising a plurality of second confining tubular features distributed in a ring and encircling, at least partially, a second core so as to confine the light radiation to the second core, a coupling element arranged between the first and second cores, the coupling element comprising at least one coupling tubular feature comprised at least partially in the first microstructured cladding and/or the second microstructured cladding and having a wall thickness tcp called the coupling thickness and a material index ncp called the coupling index, an arrange- (Continued)

ment of the coupling element, the coupling thickness tcp and the coupling index ncp being configured so as to create a leakage channel at the wavelength $\lambda$op allowing the radiation guided by the first optical fiber to be coupled to the second optical fiber and/or the radiation guided by the second optical fiber to be coupled to the first optical fiber.

12 Claims, 6 Drawing Sheets

(56) References Cited

U.S. PATENT DOCUMENTS

| | | | | |
|---|---|---|---|---|
| 2004/0161199 A1* | 8/2004 | Oh | ........................ | G02B 6/2821 |
| | | | | 385/125 |

| | | | | |
|---|---|---|---|---|
| 2009/0263090 A1* | 10/2009 | Dangui | .............. | G02B 6/02338 |
| | | | | 385/39 |
| 2012/0069428 A1* | 3/2012 | Limpert | ............. | G02B 6/02361 |
| | | | | 359/341.1 |
| 2017/0322370 A1* | 11/2017 | Dong | .................. | G02B 6/02009 |
| 2024/0319445 A1* | 9/2024 | Benabid | ............. | G02B 6/02328 |

FOREIGN PATENT DOCUMENTS

| | | | |
|---|---|---|---|
| FR | 3 095 703 A1 | 11/2020 |
| JP | 2013-190589 A | 9/2013 |

OTHER PUBLICATIONS

Debord, et al., "Hollow-Core Fiber Technology: The Rising of Gas Photonics", Fibers, vol. 7, No. 16, 2019.

* cited by examiner

COUPLING DEVICE FOR COUPLING HOLLOW-CORE OPTICAL FIBRES COMPRISING A COUPLING ELEMENT

CROSS-REFERENCE TO RELATED APPLICATIONS

This application is a National Stage of International patent application PCT/EP2022/068978, filed on Jul. 7, 2022, which claims priority to foreign French patent application No. FR 2107433, filed on Jul. 8, 2021, the disclosures of which are incorporated by reference in their entireties.

FIELD OF THE INVENTION

The invention relates to microstructured coupling-inhibited hollow-core optical fibers, and more particularly to couplers for hollow-core optical fibers.

BACKGROUND

The purpose of an optical-fiber coupler is to transfer, with a minimum of optical losses, radiation guided in the core of one fiber to the core of another fiber. It is known to make a coupler by juxtaposing two optical fibers and bringing the cores of the two fibers together via various techniques (polishing for example). Thus, the optical claddings of the two fibers overlap and some of the light propagating through a first optical fiber propagates into a second optical fiber. The most common way of making a coupler consists in fusing a polished lateral section of each fiber.

Microstructured hollow-core fibers can be divided into two main categories: HC-PCF-PBG fibers (HC-PCF-PBG standing for Hollow-Core, Photonic-Crystal-Fiber, Photonic BandGap) and HC-PCF-IC fibers (HC-PCF-IC standing for Hollow-Core, Photonic-Crystal-Fiber, Inhibited Coupling). These types of fiber have many advantages when used in gyrometers, in particular: they have low losses, and it is theoretically possible to transfer light from the core of the fiber to a resonant element of the microstructured cladding, or vice versa, from the resonant element to a guiding core. Likewise, this type of fiber exhibits leakage of light from its core with a very particular azimuthal distribution and polarization dependence. However, there is currently no coupler the performance of which is comparable to that of couplers using conventional solid fibers.

HC-PCF-PBG fiber couplers are being studied (see Xu, Z. et al., Design of single-polarization coupler based on dual-core photonic band-gap fiber implied in resonant fiber optic gyro. Optics Communications, 380, 302-309, (2016)). However, production thereof is extremely complex because of the guiding principle. Specifically, guidance in PCF-PBG fibers results from the existence of photonic bandgaps created by the periodicity of the structure of the microstructured cladding. Here, guidance occurs in a periodicity defect (the core) which is of index $n_1$ lower than that of the cladding. HC-PCF-PBG fibers have hollow cores (cross section of air, index $n_1=1$). Guidance is therefore different from that of conventional optical fibers or solid-core PCF fibers where light is guided in and confined to the core by total internal reflection between the core of index $n_1$ and the microstructured cladding, which possesses an average index $n_{2_{eff}}$ lower than $n_1$.

Thus, producing a coupler using PCF-PBG fibers presupposes working the microstructured cladding so as to eliminate a section without adversely affecting the physical integrity of the cladding or its optical properties. The aim is to bring the cores to a distance of the order of the wavelength of interest (~1 micron) in order to make the evanescent field of the two modes of the cores of the two hollow-core fibers to be coupled overlap. In concrete terms, it is very difficult to modify the structure of the microstructured cladding so as to bring the two cores close enough together, without excessively impacting the quality of the fiber and the PBG confinement.

Alternatively, IC fibers are optical fibers that have core walls of negative curvature, providing low attenuation, the ability to maintain polarization, core modes of a relatively large size, a very small spatial overlap between the core mode and the silica wall of the core and a coupling efficiency exceeding 90% (see Debord, B. et al. Hollow-Core Fiber Technology: The Rising of "Gas Photonics". Fibers 2019, 7, 16.). In an HC-PCF-IC fiber, since the core mode and the cladding mode have the same effective index, light propagating in the core could therefore theoretically propagate in the cladding. However, confinement and guidance of the core mode in these fibers is based on inhibition between coupling of the core mode and cladding mode, this inhibition being obtained via the structure of the microstructured cladding and the structure of the outline of the core. In other words, the scalar product between the electric field of the core mode $|\phi_{core}\rangle$ and the electric field of the cladding mode $|\phi_{cladding}\rangle$ is very small. The term describing coupling between these two modes can be lowered by achieving a small spatial intersection between the fields $|\phi_{core}\rangle$ and $|\phi_{cladding}\rangle$ or by achieving a large shift between the transverse spatial phase of the core and cladding modes. Since this confinement exists only for certain wavelength ranges, discontinuities are then observed in the index dispersion curve and therefore in the transmission curve.

FIG. 1A shows a curve of propagation losses as a function of wavelength for a typical HC-PCF-IC fiber known in the prior art and illustrated in FIG. 1B. This fiber is said to have an HC-PCF-IC-SR-TL structure because the microstructured cladding GMS comprises a plurality of tubular features (TL standing for Tubular Lattice)—which are typically made of silica-arranged around the hollow core C in a single ring (SR standing for Single Ring). In the illustrated example, the wall thickness of the tubular features is equal to 2 μm. As explained above, discontinuities in the propagation loss curve may be seen in FIG. 1A. It may be seen that wavelengths comprised in the range Zcf have very low losses because there is a small spatial intersection between the fields $|\phi_{core}\rangle$ and $|\phi_{cladding}\rangle$ or a large shift between the transverse spatial phase of the core and cladding modes. Wavelengths comprised in this range Zcf can therefore be guided within the core C over long distances. The curve of FIG. 1A illustrates one example of a wavelength $\lambda_0$ that can be guided by the fiber of FIG. 1B. In contrast, wavelengths comprised in the range Zcp have much higher losses because there is substantial coupling between the cladding modes and core mode, and therefore they cannot be guided effectively.

It is known that fibers possessing a microstructured cladding of this type have particular leakage fields that depend on the structure of the microstructured cladding. Coupling two HC-PCF-IC fibers requires them to be brought close enough together and their respective azimuthal orientation to be adjusted so that the leakage fields of the fibers overlap in the coupler. More precisely, the coupling mechanism is based on leakage from one fiber "to" the other fiber and vice versa. When making a coupler, the choice of the operating wavelength is a compromise between the strength of the leakage fields (and therefore coupling efficiency) and propagation losses.

It is known from document CN108549128A to produce a coupler based on two IC-HC optical fibers, the two cores being separated by an empty section. This empty section is obtained by polishing the external cladding and the microstructured cladding. It forms the main leakage channel, allowing coupling of radiation guided by one fiber to the other fiber when there is an overlap between the respective leakage channel of each fiber. However, critically, this embodiment requires the distance between the cores (or interstitial distance) to be smaller than the wavelength, in order to ensure a sufficient overlap between the main leakage channel of the two fibers and thus to allow effective coupling. If the distance between the two cores is too large, the maximum overlap between the leakage fields that is obtainable by adjusting the azimuthal orientations of the two fibers will be greatly reduced, as will coupling efficiency. In contrast, obtaining the smallest possible interstitial distance requires a large section of the microstructured cladding of the two fibers to be polished, this having the potential to greatly degrade the performance of the optical fibers in the coupler. In addition, the interstitial distance is also limited by the external cladding encircling the microstructured cladding. In practice, it is therefore not possible to decrease the interstitial distance beyond a certain value. The coupling efficiency of this device is therefore limited by these constraints.

SUMMARY OF THE INVENTION

The invention aims to overcome certain of the aforementioned problems with the prior art by means of an IC-HC optical fiber coupler having a coupling element arranged between the core of each fiber, the coupling element having a position, materials and geometry configured to create a leakage channel allowing radiation guided by one fiber to be coupled to the other fiber.

To this end, one subject of the invention is a device for coupling optical fibers, comprising:

a first coupling-inhibited hollow-core optical fiber comprising a first microstructured cladding comprising a plurality of first confining tubular features distributed in a ring and encircling, at least partially, a first core so as to confine at least radiation at a wavelength $\lambda_{op}$ to said first core, a second coupling-inhibited hollow-core optical fiber comprising a second microstructured cladding comprising a plurality of second confining tubular features distributed in a ring and encircling, at least partially, a second core so as to confine said light radiation to said second core, a coupling element arranged between the first and second cores, said coupling element comprising at least one coupling tubular feature comprised at least partially in said first microstructured cladding and/or said second microstructured cladding and having a wall thickness $t_{cp}$ called the coupling thickness and a material index $n_{cp}$ called the coupling index, an arrangement of the coupling element, the coupling thickness $t_{cp}$ and the coupling index $n_{cp}$ being configured so as to create a leakage channel at said wavelength $\lambda_{op}$ allowing the radiation guided by the first optical fiber to be coupled to the second optical fiber and/or the radiation guided by the second optical fiber to be coupled to the first optical fiber.

According to one embodiment of the invention, each coupling tubular feature $i \in [1,N]$ has a coupling thickness $t_{cp,i}$ and a coupling index $n_{cp,i}$ such that $$t_{cp,i} \in \left[ \frac{100}{101} \frac{m(i)}{2} \frac{\lambda_{op}}{\sqrt{n_{cp,i}^2 - 1}}, \frac{100}{99} \frac{m(1)}{2} \frac{\lambda_{op}}{\sqrt{n_{cp,i}^2 - 1}} \right],$$

with $m \in \mathbb{N}^*$.

According to one embodiment of the invention, the coupling tubular features are arranged so that a distance $D_{12}$ between the center of a coupling tubular feature and an adjacent coupling tubular feature is less than said wavelength $\lambda_{op}$.

According to one embodiment of the invention, the coupling element comprises at least a first and a second coupling tubular feature. Preferably, in this embodiment, the plurality of first and second confining tubular features partially encircle said first and second cores, respectively, said first coupling tubular feature being arranged within the first optical fiber, facing a segment of the first core that is not encircled by the plurality of first confining tubular features, said second coupling tubular feature being arranged within the second optical fiber facing a segment of the second core that is not encircled by the plurality of second confining tubular features, the first and second coupling tubular features being arranged facing each other.

According to another embodiment of the invention, the plurality of first and second confining tubular features completely encircles the first and second cores, respectively, said first and second coupling tubular features are nested in one of said first and second confining tubular features, respectively, and the first and second coupling tubular features are arranged facing each other.

According to another embodiment of the invention, the first coupling tubular feature is arranged within the first optical fiber, facing a segment of the first core that is not encircled by the plurality of first confining tubular features, and the plurality of second confining tubular features completely encircles the second core, said second coupling tubular feature being nested in one of said second confining tubular features and arranged opposite said first coupling tubular feature.

According to one embodiment of the invention, the coupling element comprises at least one additional tubular feature forming one of the coupling tubular features, which feature is arranged between the first and second coupling tubular features.

According to another embodiment of the invention, the coupling element comprises a single coupling tubular feature. Preferably, in this embodiment, the coupling tubular feature is arranged facing a segment of the first core that is not encircled by the plurality of first confining tubular features and facing a segment of the second core that is not encircled by the plurality of first confining tubular features, said tubular feature being placed substantially between said segments. Alternatively, the plurality of first confining tubular features completely encircles the first core and the plurality of second confining tubular features partially encircles the second core, said coupling tubular feature being arranged within the second optical fiber, facing a segment of the second core that is not encircled by the plurality of second confining tubular features, an azimuthal orientation of the first and second optical fibers within the device being configured to maximize an overlap of said leakage channel with a leakage profile of said first microstructured cladding.

According to one embodiment of the invention, the coupling thickness or thicknesses $t_{cp}$ and the coupling index or indices $n_{cp}$ are configured so that said radiation is guided from the first optical fiber to the second optical fiber by exciting a spatial mode different from a spatial mode of said radiation guided by said first optical fiber.

BRIEF DESCRIPTION OF THE DRAWINGS

Other features, details and advantages of the invention will become apparent on reading the description given with reference to the appended drawings, which are given by way of example and which show, respectively.

References to the figures, when they are identical, correspond to the same elements.

In the figures, the elements are not to scale unless indicated otherwise.

DETAILED DESCRIPTION

Figure 2:
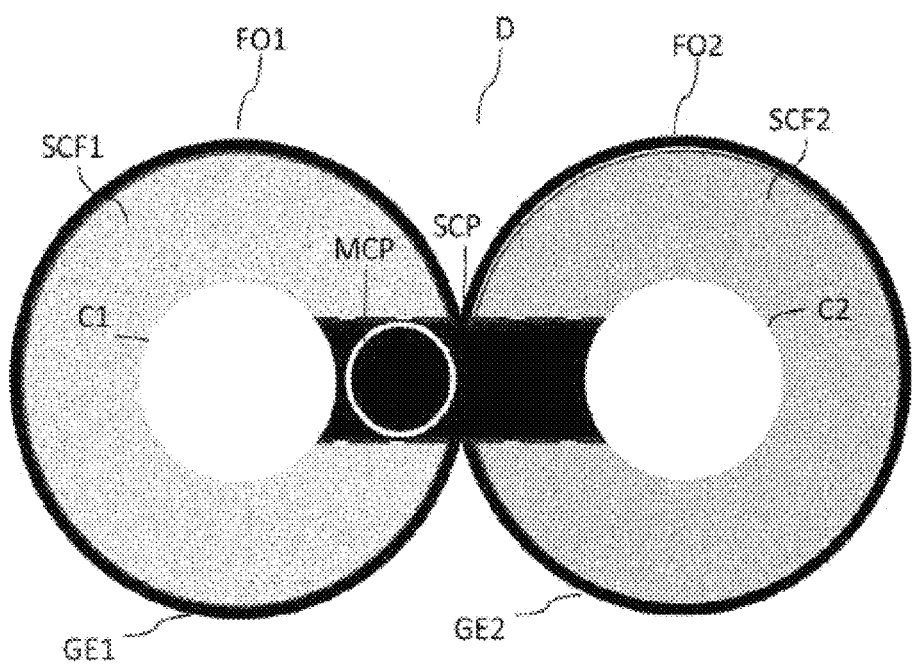

FIG. 2 schematically illustrates a coupling device D for an inhibited-coupling hollow-core (IC-HC) optical fiber according to the invention. This device D comprises a first IC-HC optical fiber FO1. This first optical fiber FO1 possesses a first microstructured cladding SCF1 comprising a plurality of first confining tubular features MCF1 (not shown in FIG. 2 but visible in FIG. 3 for example). The first features MCF1 are distributed in a ring encircling, at least partially, the core of the fiber FO1, which is called the first core C1, so as to confine at least radiation at a wavelength $\lambda_{op}$ to the first core. It will be understood that the features may be distributed in a single ring or a plurality of concentric rings without departing from the scope of the invention.

Likewise, the device comprises a second IC-HC optical fiber FO2 comprising a second microstructured cladding SCF2. This second microstructured cladding comprises a plurality of second confining tubular features MCF2, distributed in a ring and encircling, at least partially, the core C2 of the fiber FO2, which is called the second core, so as to confine light radiation to the second core at the wavelength $\lambda_{op}$.

The fibers FO1, FO2 respectively comprise a first and a second outer cladding GE1, GE2 encircling and protecting the microstructured claddings SCF1, SCF2.

In a manner known per se, in order to achieve confinement of the radiation at $\lambda_{op}$ to the first and second cores C1, C2, the first and second confining tubular features MCF1, MCF2 respectively have a first and a second thickness, called the confining thickness $t_{cf1}$, $t_{cf2}$, and a first and a second index, called the confining index $n_{cf1}$, $n_{cf2}$, such that:

$$t_{cf1,2} \in \left[ \frac{2\lambda_{op}}{\sqrt{n_{cf,12}^2 - 1}} \frac{m(m+1)}{4m+3}, \frac{2\lambda_{op}}{\sqrt{n_{cf1,2}^2 - 1}} \frac{m(m+1)}{4m+1} \right],$$

with $m \in \mathbb{N}*$. Preferably, the first confining features have an identical first wall thickness $t_{cf,1}$ in order to minimize transmission losses. Likewise, the second confining features have an identical wall thickness $t_{cf,2}$ in order to minimize transmission losses. By way of non-limiting example, for confining features made of silica, for radiation at $\lambda_{op}=1550$ nm, $t_{cf} \in [843$ nm, $1181$ nm], or $t_{cf} \in [1610$ nm, $1968$ nm] or indeed $t_{cf} \in [2362$ nm, $2725$ nm].

The confining tubular features MCF1, MCF2 may for example be circular cylindrical tubes or indeed features of nested structure, i.e. various concentric tubes with increasingly small diameters are placed inside one another. Alternatively, these tubular features may be tubes of elliptical shape, the major axis of the ellipses being oriented radially, toward the center of the fiber, or indeed of any shape known to those skilled in the art. It will be understood that the structure of the first and the structure of the second microstructured cladding may or may not be identical without departing from the scope of the invention.

As mentioned above, it is known to make a coupler with IC-HF optical fibers by polishing the external claddings of the two fibers, thus obtaining a polished face for each fiber. The coupler is then formed by bringing the two fibers together so that the interstitial distance is less than the wavelength and then splicing the two polished faces of the two fibers, the azimuthal orientations of the two fibers in the coupler being adjusted so that the overlap of the leakage profiles of the two fibers is maximized. In this particular case, in order to ensure optimum guidance of the radiation, the tubular features of the microstructured claddings have an identical wall thickness. The overlap of the leakage profiles makes it possible to ensure a good coupling efficiency is obtained even though limited by the interstitial distance.

The invention differs from the prior art in that the coupling between the two fibers is achieved by means of a coupling element SCP that is resonant with the mode guided at the wavelength $\lambda_{op}$ in the first core C1 and/or with the mode guided at the wavelength $\lambda_{op}$ in the second core C2. As will be explained below, this coupling element makes it possible to create a leakage channel from the first core C1 to the second core C2 and/or from the second core C2 to the first core C1. This coupling element makes it possible to obtain a high coupling efficiency, without introducing excessively high transmission losses. Specifically, use of such a coupling element makes it possible to ensure a high coupling and guiding efficiency is obtained, while avoiding the need to polish a large section of the microstructured cladding of the two fibers to bring the cores closer together and maximize the overlap of the leakage profiles as in the prior art, this step potentially greatly degrading the performance of the optical fibers.

The coupling element SCP is arranged between the first and second cores and comprises at least one coupling tubular feature MCP. By way of non-limiting example, the device D illustrated in FIG. 2 comprises a single coupling tubular feature MCP. Alternatively, according to another embodiment, the coupling element SCP comprises a plurality of coupling tubular features, the latter preferably being aligned on an axis connecting the cores C1, C2. Alignment of the features makes it possible to obtain the smallest possible distance in order to optimize the coupling (see FIG. 3 or 5A for example). At least one of the coupling tubular features is at least partially comprised in the first microstructured cladding SCF1 and/or in the second microstructured cladding SCF2. More precisely, according to a first alternative, at least one coupling tubular feature MCP is at least partially comprised in the first cladding SCF1 in order to create a leakage channel from the first core C1 to the second core C2. A coupler from fiber FO1 to FO2 is then obtained. According to a second alternative, at least one tubular feature MCP is at least partially comprised in the second cladding SCF2 in order to create a leakage channel from the second core C2 to the first core C1. A coupler from fiber FO2 to FO1 is then obtained. According to a third alternative, at least one tubular feature MCP is at least partially comprised in the first and second claddings SCF1, SCF2 in order to create a leakage channel from the first core C1 to the second core C2 and from the second core C2 to the first core C1. A coupler from fiber FO2 to FO1 and from fiber FO1 to FO2 is then obtained.

Specifically, via simulations and experimental tests, the inventors have realized that using coupling tubular features MCP having a specifically configured wall thickness $t_{cp}$, called the coupling thickness, a specifically configured material index $n_{cp}$, called the coupling index, and a specifically configured arrangement of the coupling element, makes it possible to create a leakage channel at the wavelength lop through this coupling element, thus allowing radiation guided by the first optical fiber to be coupled to the second optical fiber and/or radiation guided by the second optical fiber to be coupled to the first optical fiber. More precisely, the coupling tubular features MCP have a coupling thickness $t_{cp}$ different from the confining thickness $t_{cf1}$, $t_{cf2}$ of the first and second confining tubular features in order to create a break in symmetry in the first and/or second microstructured cladding(s) SCF1, SCF2. This break in symmetry induces a leakage channel for radiation through the coupling tubular features and therefore allows a mode of the core C1, C2 to couple to the cladding SCF1, SCF2. This leakage channel thus allows coupling between the two fibers FO1, FO2 of the device.

Figure 4A:
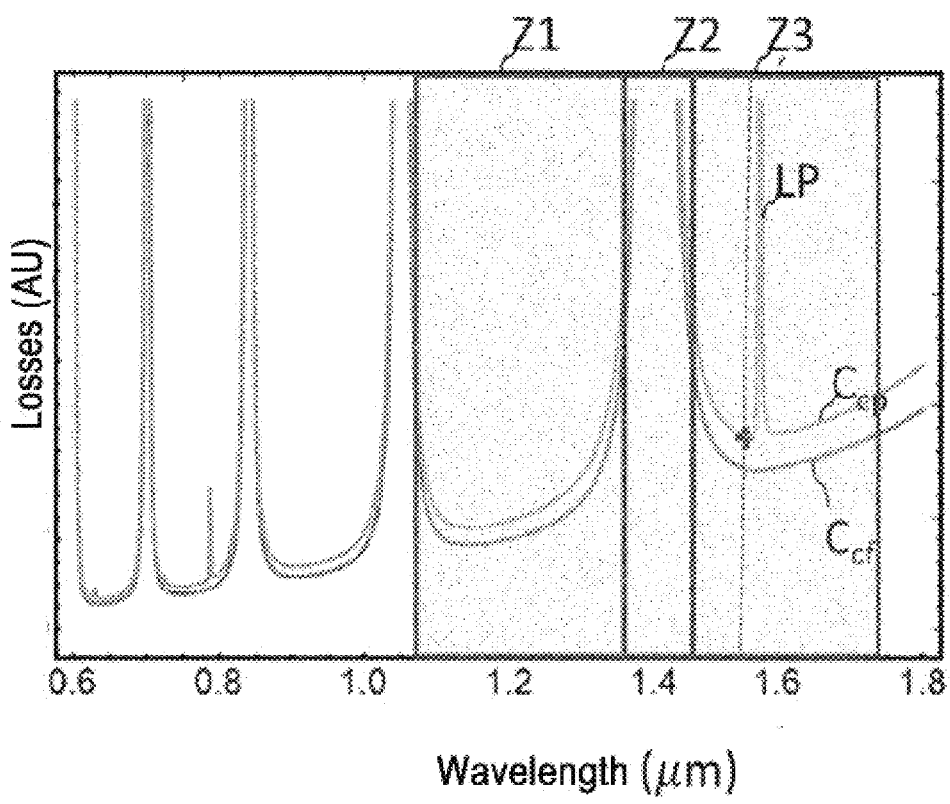

The inventors have determined that, to create this leakage channel, it is necessary for each coupling tubular feature $i \in [1, N]$ to have a coupling thickness $t_{cp,i}$ and a coupling index $n_{cp,i}$ such that, $$t_{cp1,2} \in \left[ \frac{100}{101} \frac{m(i)}{2} \frac{\lambda_{op}}{\sqrt{n_{cp1,2}^2 - 1}}, \frac{100}{99} \frac{m(i)}{2} \frac{\lambda_{op}}{\sqrt{n_{cp1,2}^2 - 1}} \right] (G1),$$

with $m(i) \in \mathbb{N}*$. This condition makes it possible for the effective index $n_{eff,cp}$ of the coupling element to be substantially equal to an effective index $n_{eff,c1}$ of the first core and/or an effective index of the second core at the wavelength $\lambda_{op}$ and thus for the coupling element to be resonant with the first and/or the second core(s). Advantageously, leakage of the radiation guided in the core C1 and/or C2 occurs very predominantly through the coupling tubular feature. This thus allows a good coupling efficiency to be obtained while keeping propagation losses low. FIG. 4A more precisely illustrates the effect of the coupling element SCP and of the coupling tubular features MCP on the propagation loss curve of the fibers FO1, FO2 (see below).

The shape of the cross section of the coupling tubular features MCP may be circular or even elliptical, the major axis of the ellipses being oriented radially, toward the center of the fiber, or indeed any feature known for HC-PCF-IC fibers by those skilled in the art may be used. The coupling tubular features MCP may be of a shape identical to that of the confining tubular features or of a different shape without departing from the scope of the invention.

Figure 3:
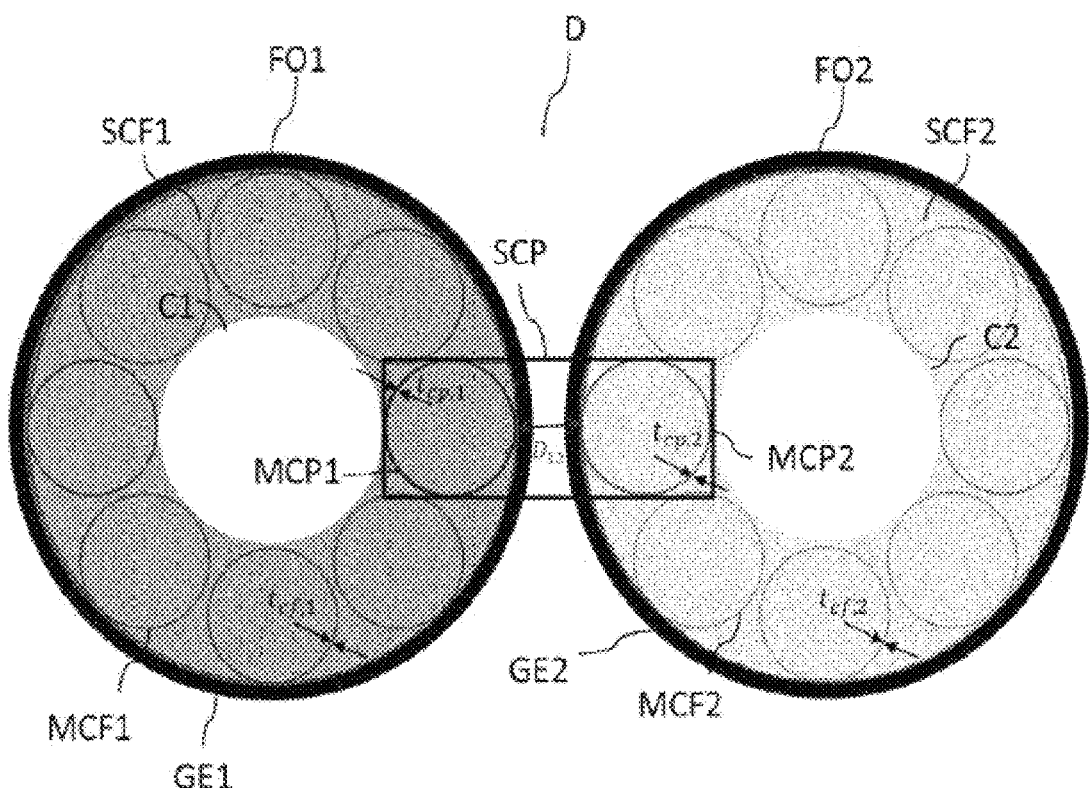

As mentioned above, in order to obtain good coupling efficiency, it is not necessary for the distance between the cores C1 and C2 to be less than the wavelength. However, when the coupling element comprises a plurality of coupling tubular features MCP, it is then necessary for a distance $D_{12}$ between two adjacent coupling tubular features to be less than 100 times said wavelength $\lambda_{op}$, preferably less than $10\lambda_{op}$, and more preferably less than $\lambda_{op}$ in order to ensure that the coupling efficiency is sufficiently high. This distance $D_{12}$ is illustrated in FIG. 3 for example. It is defined as the minimum distance between the external wall of two adjacent coupling tubular features. By adjacent features MCP, what is meant here is two tubular features the centers of which are closest compared to other tubular features. Critically, this condition can be met without polishing a section of the microstructured claddings SCF1, SCF2 and therefore without degrading the performance of the optical fibers FO1, FO2 in the coupler (see for example FIG. 3 or 5A).

As mentioned above, it is known that HC-PCF-IC fibers such as the fibers FO1, FO2 have leakage fields with a particular radial distribution that depends on the exact structure of the microstructured claddings SCF1, SCF2. Thus, within the device D, the fibers FO1, FO2 possess a respective azimuthal orientation configured so that there is a maximum overlap of the leakage fields of the fibers, in order to maximize coupling efficiency.

Up to here, the device D of the invention has been described for two HC-PCF-IC fibers FO1, FO2 without precisely describing the arrangement between the structure of the microstructured claddings SCF1, SCF2 and the structure of the one or more tubular features of the coupling element. FIGS. 3 to 9 show various embodiments with reference to which these structures will be described in more detail.

In a first variant of the invention, illustrated in FIGS. 3 to 7, the coupling element SCP of the device D comprises at least a first and a second coupling tubular feature MCP1, MCP2.

FIG. 3 illustrates one embodiment of this first variant of the invention, in which the first and second microstructured cladding MCF1, MCF2 comprise a plurality of first and second confining tubular features MCF1, MCF2 distributed in a single ring and partially encircling the first and second cores C1, C2, respectively. In the embodiment of FIG. 3, the first coupling tubular feature MCP1 is arranged within the first optical fiber FO1, facing a segment of the first core C1 that is not encircled by the confining features MCF1 of the first microstructured cladding SCF1. Likewise, the second coupling tubular feature MCP2 is arranged within the second optical fiber FO2, facing a segment of the second core that is not encircled by the confining features MCF2 of the second microstructured cladding. As explained above, the first and second confining tubular features MCF1, MCF2 respectively have a first and a second confining thickness $t_{cf1}$, $t_{cf2}$ and a first and a second confining index $n_{cf1}$ and $n_{cf2}$ such that:

$$t_{cf1,2} \in \left[ \frac{2\lambda_{op}}{\sqrt{n_{cf1,2}^2 - 1}} \frac{m(m+1)}{4m+3}, \frac{2\lambda_{op}}{\sqrt{n_{cf1,2}^2 - 1}} \frac{m(m+1)}{4m+1} \right],$$

with $m \in \mathbb{N}^*$ in order to confine radiation at the wavelength $\lambda_{op}$. In addition, the first and second coupling tubular features have first and second coupling thicknesses $t_{cp,1}$, $t_{cp,2}$ and first and second coupling indices $n_{cp1}$, $n_{cp2}$ such that $$t_{cp1,2} \in \left[ \frac{100}{101} \frac{m}{2} \frac{\lambda_{op}}{\sqrt{n_{cp1,2}^2 - 1}}, \frac{100}{99} \frac{m}{2} \frac{\lambda_{op}}{\sqrt{n_{cp1,2}^2 - 1}} \right],$$

with $m \in \mathbb{N}^*$ in order to create a leakage channel.

In order to maximize coupling efficiency, the first and second coupling tubular features are arranged facing each other and so that a distance $D_{12}$ between the external wall of two adjacent coupling tubular features MCP1, MCP2 is smaller than 100 times the wavelength $\lambda_{op}$, preferably smaller than $10\lambda_{op}$, and more preferably smaller than $\lambda_{op}$.

In the device of the invention, the fibers FO1, FO2 may be held at a fixed distance by means of a housing in order to form a coupler. Alternatively, the fibers are spliced together via their external claddings GE1, GE2 encircling the micro-structured claddings SCF1, SCF2.

Figure 1A:
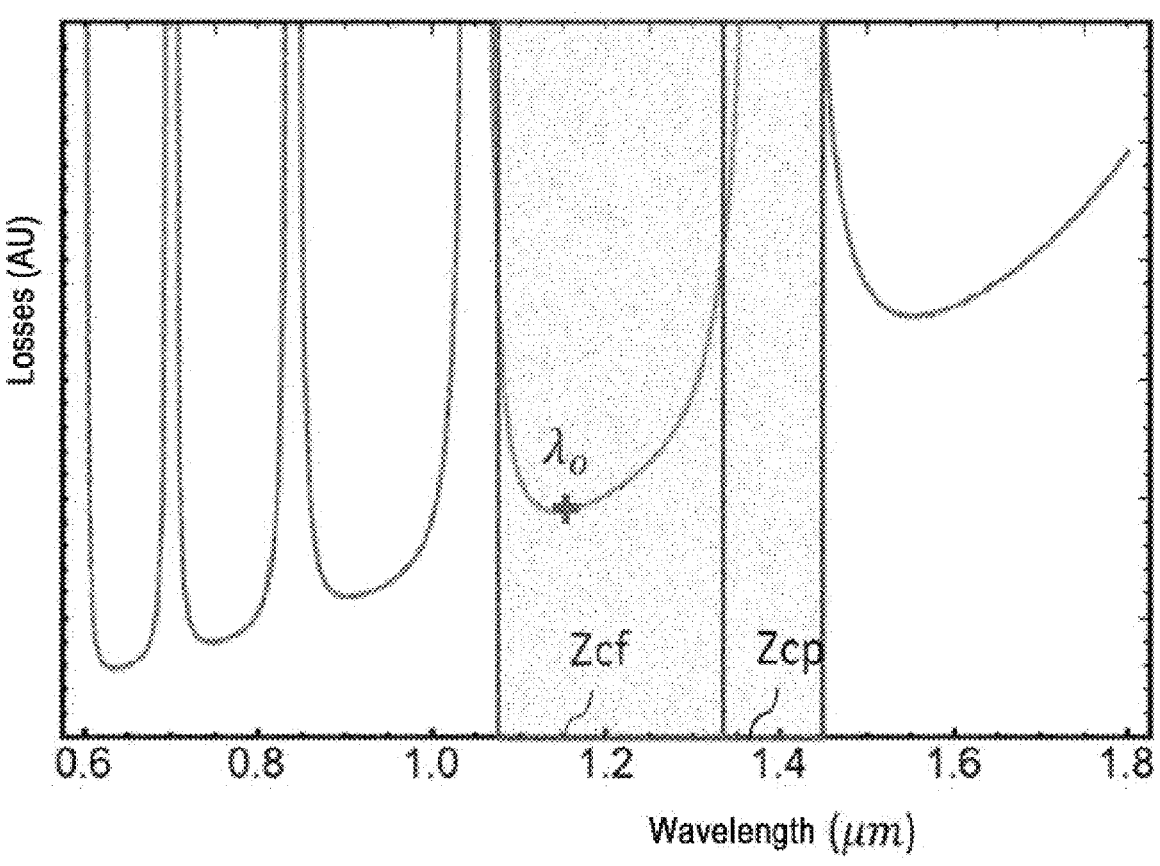
FIG. 1A a curve of propagation losses as a function of wavelength for a typical HC-PCF-IC fiber known in the prior art and illustrated in FIG. 1B, FIG. 2, a coupling device for an inhibited-coupling hollow-core optical fiber according to the invention, FIG. 3, one embodiment of a first variant of the invention, FIG. 4A, a graphical representation allowing the effect of the coupling element SCP and more precisely of confining tubular features within the fibers of the invention to be better illustrated, FIG. 4B, the radial field of the Poynting vector of the fiber of the embodiment of FIG. 3, FIG. 5A and FIG. 5B, a transverse and top view of the device D according to one embodiment of the first variant of the invention, respectively, FIG. 6, an embodiment of the invention in which confining features encircle the first and second cores, respectively, FIG. 7, a device according to one embodiment of the invention, FIG. 8, a device according to one embodiment of the invention.
Figure 1B:
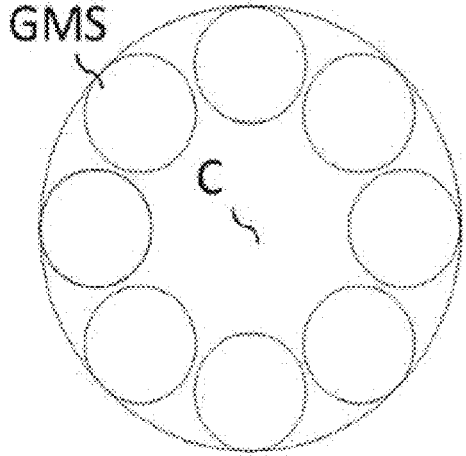

FIG. 4A is a graphical representation allowing the effect of the coupling element SCP and more precisely of the confining tubular features MCF1, MCF2 within the fibers FO1, FO2 to be better illustrated. FIG. 4A shows propagation losses as a function of wavelength for two different fibers. Firstly, a fiber, referred to as the conventional fiber, that is similar to the one shown in FIG. 1B, i.e. an HC-PCF-IC-SR-TL fiber with only one confining tubular feature completely encircling the hollow core of the fiber. The tubular features of the microstructured cladding of the conventional fiber are made of silica and have a wall thickness of 2 μm. The propagation loss curve of this conventional fiber is curve $C_{cf}$ of FIG. 4A. The propagation loss curve $C_{cp}$ of FIG. 4A corresponds to that of the fibers FO1, FO2 of the embodiment of FIG. 3. These fibers are identical to the conventional fiber except that, in the fibers FO1, FO2, one of the confining tubular features of confining thickness $t_{cf1}$, $t_{cf2}$ and confining index $n_{cf1}$, $n_{cf2}$ has been replaced by one of the coupling tubular features MCP1, MCP2 of coupling thickness $t_{cp,1}$, $t_{cp,2}$ and of coupling index $n_{g1}$, $n_{g2}$.

Study of FIG. 4A will allow it to be noted that, in the wavelength range Z1, losses are substantially higher for the fibers FO1, FO2 than for the conventional fiber. This is a result of introduction of the coupling tubular feature MCP1 MCP2, which creates a break in symmetry in the micro-structured cladding of the fibers FO1, FO2 and therefore slightly deteriorates the confinement of these wavelengths in the range Z1. In addition it will be noted that introduction of the coupling tubular feature MCP1 MCP2 into the fibers FO1, FO2 does not modify the fact that the wavelengths of the range Z2 are not confined to the core. In the fibers FO1, FO2 and in the conventional fiber, these wavelengths of the range Z2 are not confined to the core and "escape" through the microstructured cladding. Lastly, in the wavelength range Z3, it will be noted that, in the fibers FO1, FO2, the coupling element LP creates a leakage channel LP centered on about $\lambda_{LP}$=1.55 μm, that is not present in the curve $C_{cf}$ for the conventional fiber.

Figure 4B:
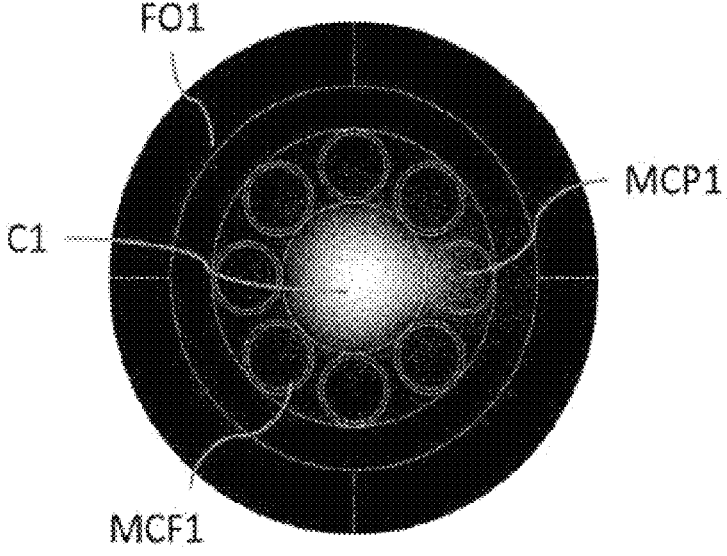

Regarding the radial distribution of the leakage field, the leakage occurs through the coupling element SCP via the first and second coupling tubular features MCP1, MCP2. The radial field of the Poynting vector of the fiber of the embodiment of FIG. 3 has been shown in FIG. 4B and allows the radial distribution of the leakage field to be observed. In FIG. 4B, the lighter a region, the higher the electric field in this region. Although the most intense field is that confined to the core of the fiber, it may be seen that there is a non-negligible leakage field through the coupling feature MCP1. The presence of this coupling tubular feature MCP1, MCP2 therefore allows directional and controlled leakage to be created. Since the arrangement of the first and second coupling tubular features within the microstructured cladding is symmetrical in the fiber FO1 and in the fiber FO2 in the embodiment of FIGS. 3 and 4, the coupling element creates a leakage channel in the first fiber FO1 and in the second fiber FO2. It is the spatial overlap between the respective leakage channels LP of the fibers FO1 and FO2 that makes it possible to couple, with a good coupling efficiency, the fiber FO1 to the fiber FO2 and vice versa in the device of the embodiment of FIG. 3. It is for this reason that the first and second coupling tubular features MCP1, MCP2 face each other. Thus, unlike prior-art HC-PCF-IC-SR-TL fiber couplers in which it was necessary to degrade the performance of the optical fibers, the invention allows efficient coupling without introducing high propagation losses.

As mentioned above, there is a compromise between the strength of the leakage channel LP (and therefore coupling efficiency) and propagation losses. In FIG. 4A, a cross illustrates an example of a length $\lambda_{op}$ suitable for allowing efficient coupling while keeping propagation losses low. In concrete terms, it is necessary for the wavelength $\lambda_{op}$ to be close enough to the wavelength $\lambda_{LP}$ of the channel LP to allow leakage of the radiation guided in the cores C1, C2 through the coupling element SCP but not too close in order to avoid excessively high propagation losses. This optimum is to be determined by the user depending on the intended application.

Likewise, by adjusting the thickness of the coupling tubular features MCP1, MPC2, it is possible to adjust the strength of the leakage channel to the wavelength $\lambda_{op}$. More precisely, within the range G1 specified above, the closer the thickness of the coupling tubular features is to the central value of the range G1

$$\left( \text{i.e. } t_{cp} = \frac{m(i)}{2} \frac{\lambda_{op}}{\sqrt{n_{cp}^2 - 1}} \right),$$

the higher the propagation losses within the fiber and the strength of the leakage channel. Conversely, the closer the thickness of the coupling tubular features is to the bounds of the range G1

$$\left( \text{i.e. } t_{cp} = \frac{100}{99} \frac{m(i)}{2} \frac{\lambda_{op}}{\sqrt{n_{cp}^2 - 1}} \text{ or } t_{cp} = \frac{100}{101} \frac{m(i)}{2} \frac{\lambda_{op}}{\sqrt{n_{cp}^2 - 1}} \right),$$

the lower the propagation losses and the strength of the coupling leakage channel. There is therefore a compromise to be found between sufficient coupling and a correct level of losses at the wavelength $\lambda_{op}$.

Figure 5A:
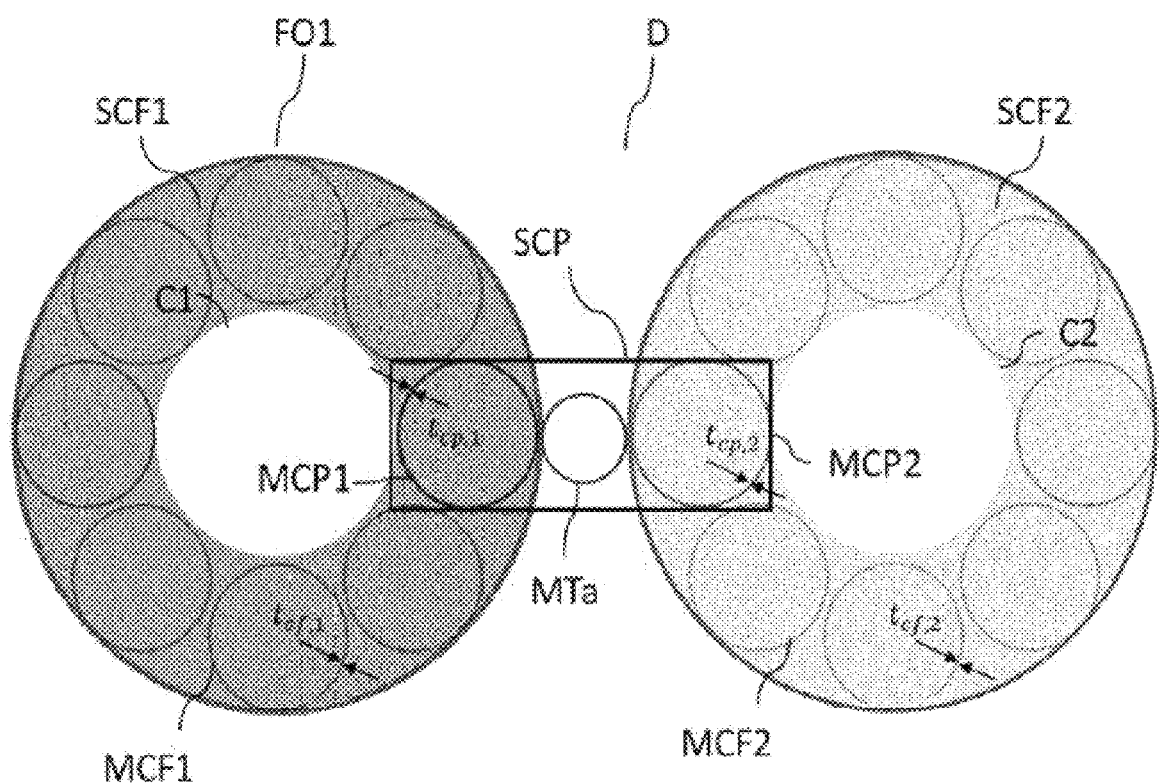
Figure 5B:
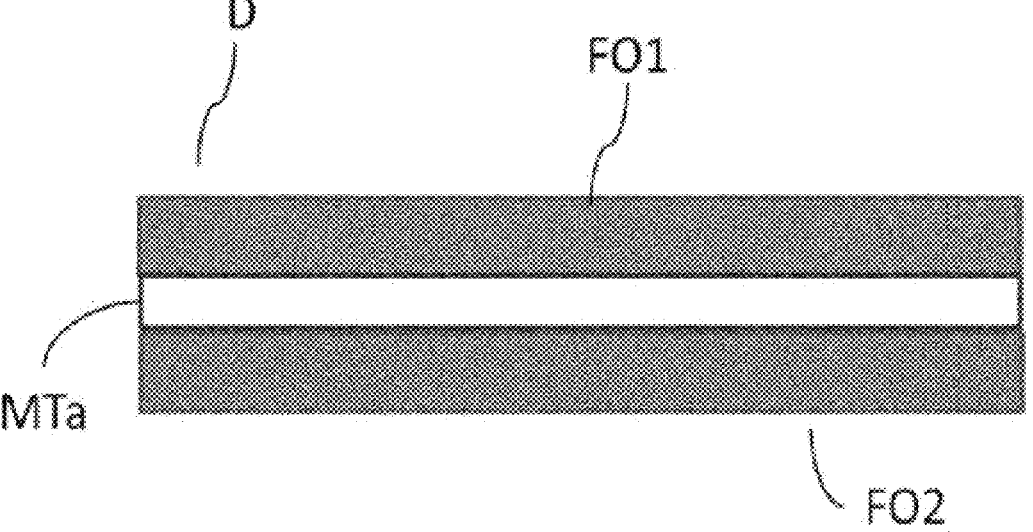

FIGS. 5A and 5B illustrate a transverse and top view of the device D according to one embodiment of the first variant of the invention, respectively, In the device of FIGS. 5A and 5B, the fibers FO1 and FO2 are identical to those of the embodiment of FIG. 4A except for the fact that the coupling element SCP comprises an additional coupling feature MTa forming one of the coupling tubular features. This feature MTa is arranged between the first and second coupling tubular features. Just like all the coupling tubular features, the additional coupling feature MTa has a coupling thickness $t_{cp,a}$ and a coupling index $n_{cp,a}$ such that $$ t_{cp1,2} \in \left[ \frac{100}{101} \frac{m}{2} \frac{\lambda_{op}}{\sqrt{n_{cp1,2}^2 - 1}}, \frac{100}{99} \frac{m}{2} \frac{\lambda_{op}}{\sqrt{n_{cp1,2}^2 - 1}} \right], $$

with $m \in \mathbb{N}^*$. In order to obtain a good coupling efficiency, the additional coupling feature MTa is arranged so that the additional coupling feature MTa is at a distance from the first and second features MCP1, MCP2 smaller than $100\lambda_{op}$ and so that the coupling features MCP1, MCP2, MTa are aligned on an axis connecting the cores C1, C2. The additional coupling feature MTa allows coupling between the fibers FO1, FO2 to be facilitated, this being achieved without the need to splice the external cladding of the fibers (which cladding is not shown in FIGS. 5A and 5B). Specifically, according to one embodiment, the fibers FO1, FO2 are held in a fixed position by means of a housing so as to be placed next to or juxtaposed with the additional coupling feature MTa, thus forming a simple and effective coupler as illustrated in FIG. 5B.

By way of non-limiting example, the embodiment illustrated in FIGS. 5A and 5B comprises a single additional coupling feature MTa. Alternatively, according to another embodiment, the coupling element SCP comprises a plurality of additional coupling tubular features MTa arranged so that a distance between the center of two adjacent additional coupling tubular features is smaller than $100\lambda_{op}$.

Figure 6:
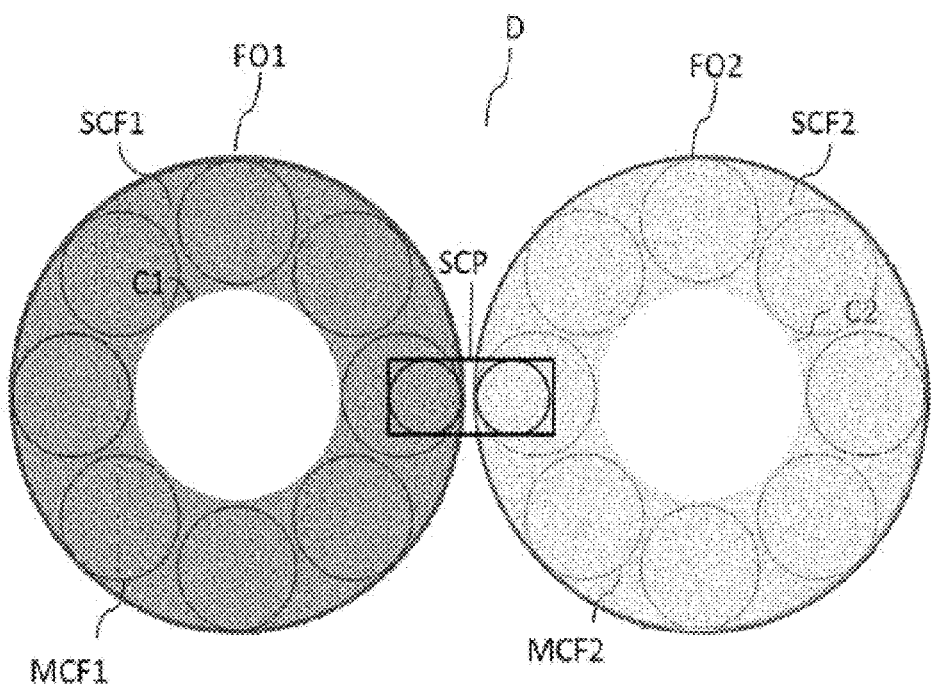

FIG. 6 illustrates one embodiment of the invention in which confining features MCF1, MCF2 completely encircle the first and second cores C1, C2, respectively. The first and second coupling tubular features MCP1, MCP2 are then nested in one of the first and second confining tubular features MCF1, MCF2, as in microstructured claddings comprising features of nested structure. In order to maximize coupling efficiency, the first and second coupling tubular features MCP1, MCP2 are arranged facing each other. The device D of this embodiment has the advantage of comprising fibers FO1, FO2 with microstructured claddings with confining tubular features MCF1, MCF2 completely encircling the core. Thus, the break in symmetry introduced by the coupling tubular features MCP1, MCP2 is smaller than in the embodiments of FIGS. 3 and 5A, 5B and propagation losses are lower.

It will be understood that the coupling element SCP of this embodiment may comprise one or more additional tubular features MTa between the first and second coupling tubular features MCP1, MCP2, as in the embodiment of FIGS. 5A and 5B.

Figure 7:
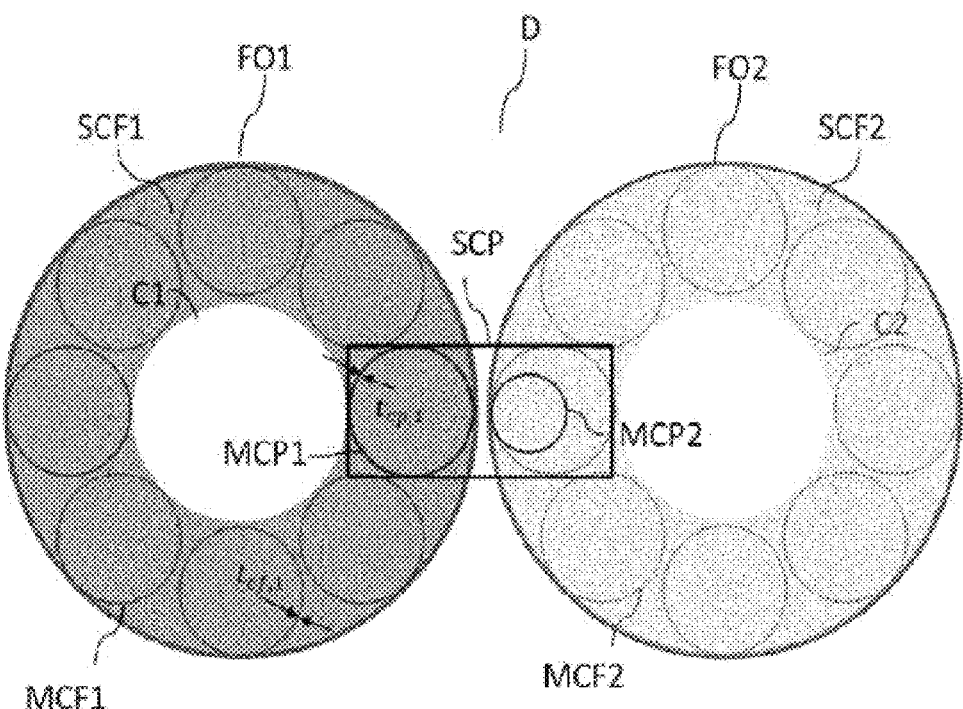

FIG. 7 schematically illustrates a device D according to one embodiment of the invention, in which the structure of the fiber FO1 is identical to the fiber FO1 of the embodiment illustrated in FIGS. 3 and 5A and in which the structure of the fiber FO2 is identical to the structure of the fiber FO2 of the embodiment illustrated in FIG. 6. More precisely, the first coupling tubular feature MCP1 is arranged within the first optical fiber, facing a segment of the first core that is not encircled by the plurality of first confining tubular features MCF1. In addition, the plurality of second confining tubular features MCF2 completely encircles the second core and the second coupling tubular feature MCP2 is nested in one of the second confining tubular features. In order to maximize coupling efficiency, the first and second coupling tubular features MCP1, MCP2 are arranged facing each other. The embodiment of FIG. 7 allows the modularity of the coupling element SCP to be illustrated.

It will be noted that the embodiment of FIGS. 3 to 7 belongs to the third alternative of the invention. In other words, the coupling element of these embodiments makes it possible to create a leakage channel for radiation guided in the first core C1 to the second core C2 and for radiation guided in the second core C2 to the first core C1. It is the symmetrical configuration of the distribution of the coupling tubular features within the element SCP that allows two-way coupling with an equivalent leakage strength from the fiber FO1 to the fiber FO2 and from the fiber FO2 to the fiber FO1.

Figure 8:
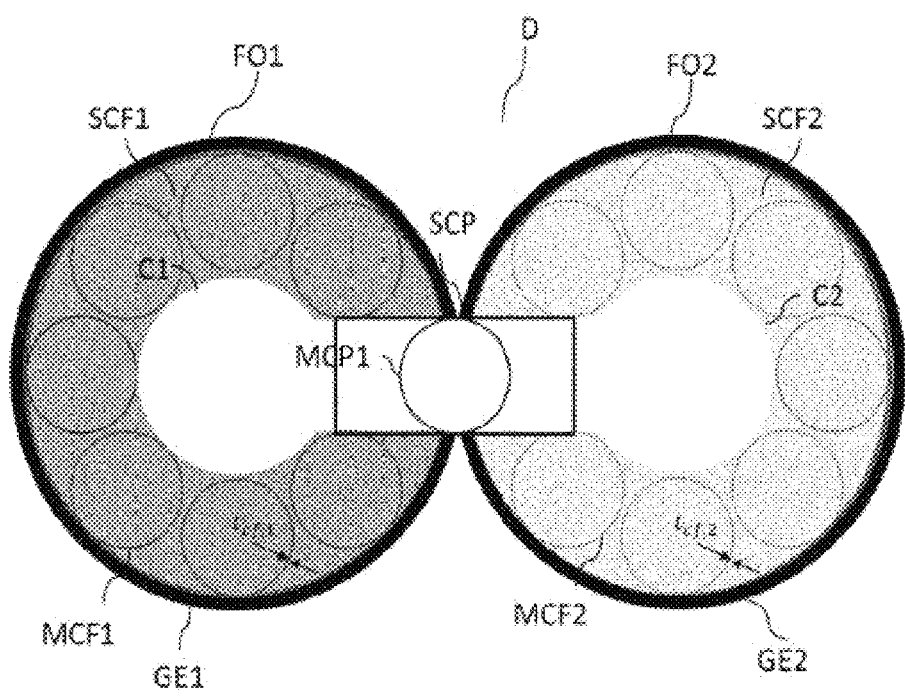
Figure 9:
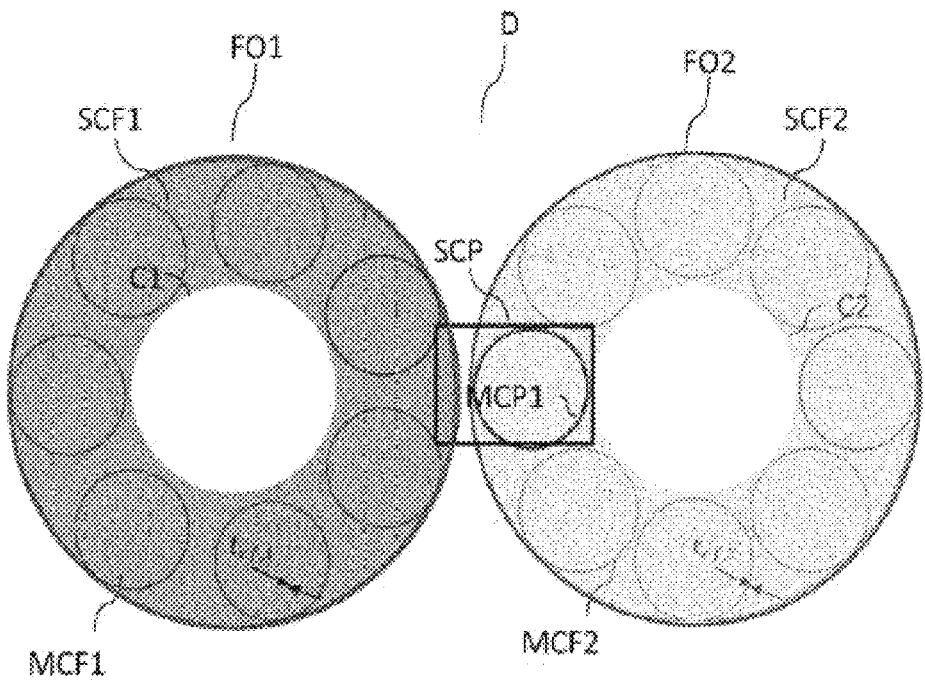
FIG. 9, a device according to one embodiment of the invention.

In a second variant of the invention, illustrated in FIGS. 8 and 9, the coupling element SCP of the device D comprises a single coupling tubular feature MCP.

FIG. 8 illustrates a device according to one embodiment of the invention, in which the coupling tubular feature MCP is arranged facing a segment of the first core C1 that is not encircled by the plurality of first confining tubular features MCF1 and facing a segment of the second core C2 that is not encircled by the plurality of second confining tubular features MCF2. The presence of a defect or break in symmetry (segment of the core that is not encircled and coupling element SCP) in the microstructured cladding of the fibers FO1, FO2 implies that leakage of the radiation guided in the core C1, C2 occurs very predominantly via this defect and therefore through the coupling element MCP. Thus, the coupling efficiency of this embodiment is particularly high because it allows the two cores C1, C2 to be brought closer together.

In order to allow the first core to be coupled to the second core and the second core to be coupled to the first core through the coupling tubular feature MCP, the tubular feature is placed substantially between the segments that are not encircled by the microstructured claddings SCF1, SCF2, halfway between the cores C1, C2. In addition, it is necessary for a distance between the first core and the coupling tubular feature and between the second core and the coupling tubular feature to be typically smaller than $100\lambda_{op}$, otherwise the maximum overlap of the leakage fields will be too small.

FIG. 9 illustrates a device according to one embodiment of the invention in which the plurality of first confining tubular features MCF1 completely encircles the first core and the plurality of second confining tubular features MCF2 partially encircles the second core. In this embodiment, the coupling tubular feature MCP is arranged within the second optical fiber FO2, facing a segment of the second core C1 that is not encircled by the plurality of second confining tubular features MCF1. In addition, an azimuthal orientation of the first and second optical fibers FO1, FO2 within the device is configured to maximize an overlap of the leakage channel with the leakage profile of said first microstructured cladding and configured to optimize the space between the tubular features of the two fibers.

In the embodiment illustrated in FIG. 9, the coupling tubular feature is arranged facing a gap or spacing between two confining tubular features MCF1 of the first microstructured cladding because, in the fiber FO1, leakage occurs mainly through the space between two confining tubular features MCF1. This is due to the fact that the spacing between the confining tubular features MCF1 is larger than a critical value. This critical value is determined by simulation. The arrangement of the coupling element and the azimuthal orientation of the fibers FO1, FO2 therefore allows efficient coupling of the second fiber to the first fiber because the coupling element creates a leakage channel for radiation guided in the second core C2 to the first core C1. It also creates a leakage channel for radiation guided in the first core C1 to the second core C2. Alternatively, according to another embodiment, the arrangement of the fibers FO1, FO2 in the coupler is inverted.

According to another embodiment of FIG. 9, the structure of the first microstructured cladding is different, so that the radial distribution of the leakage field of the fiber FO1 is different from that of FIG. 8. For example, the fiber FO1 may comprise tubular features that are closer together (separated by less than the critical value), so that leakage occurs mainly through the sections of the confining tubular features touching the external cladding GE1. Alternatively, the cladding may comprise a break in azimuthal symmetry as regards the number of confining tubes of the cladding (as in FIG. 8) so that leakage occurs mainly through this defect. The relationship between the radial distribution of the leakage field and the structure of the microstructured cladding (without any coupling tubular features) of HC-PCF-IC-SR-TL fibers is known to those skilled in the art. Patent application FR 1904610 describes various structures for the microstructured cladding of an HC-PCF-IC-SR-TL fiber— and their associated leakage profiles—that are usable in the fiber FO1 of the embodiment of FIG. 9. Although the radial distribution of the leakage field may be different depending on the structure of the cladding MCF1, in the embodiment of FIG. 9, the azimuthal orientation of the first and second optical fibers within the device is always configured to maximize an overlap of the leakage channel with the leakage profile of the first microstructured cladding.

According to one embodiment, the coupling thickness or thicknesses $t_{cp}$ and the coupling index or indices $n_{cp}$ are configured so that the radiation is guided from the first optical fiber to the second optical fiber by exciting a spatial mode (called M2) different from a spatial mode (M1) of the radiation guided by said first optical fiber. To achieve this, it is essential that the effective index of the mode M1 of the core C1 be equal to the effective index of the mode M2 of the core C2, at the wavelength $\lambda_{op}$. In addition, as specified above, these effective indices must also be equal to the effective index of the coupling element SCP. In order to control the effective index of the coupling element, in a manner known per se, it is possible to adjust the size of the cores C1, C2 and/or the shape of the cores C1, C2 and/or the index of the microstructured claddings SCF1, SCF2. It is also possible to modify the index of the cores C1, C2, for example by filling them with a particular gas and by finely adjusting the pressure of the latter within the cores C1, C2.

The invention claimed is:

1. A device (D) for coupling optical fibers, comprising:
a first coupling-inhibited hollow-core optical fiber (FO1) comprising a first microstructured cladding (SCF1) comprising a plurality of first confining tubular features (MCF1) having a first thickness, being a confining thickness $t_{cf1}$, said features being distributed in a ring and encircling, at least partially, a first core (C1) so as to confine at least radiation at a wavelength $\lambda_{op}$ to said first core, a second coupling-inhibited hollow-core optical fiber (FO2) comprising a second microstructured cladding (SCF2) comprising a plurality of second confining tubular features (MCF2) having a second thickness, being a confining thickness $t_{cf2}$, said features being distributed in a ring and encircling, at least partially, a second core (C2) so as to confine said light radiation to said second core, a coupling element (SCP) arranged between the first and second cores, said coupling element comprising at least one coupling tubular feature (MCP, MCP1, MCP2, MTa) comprised at least partially in said first microstructured cladding and/or said second microstructured cladding and having a wall thickness $t_{cp}$ being a coupling thickness and a material index $n_{cp}$ being a coupling index, said coupling thickness $t_{cp}$ being different from said first and second confining thicknesses $t_{cf1}$, $t_{cf2}$, and an arrangement of the coupling element, the coupling thickness $t_{cp}$ and the coupling index $n_{cp}$ being configured depending on said wavelength $\lambda_{op}$ so as to create a leakage channel at said wavelength $\lambda_{op}$ allowing the radiation guided by the first optical fiber to be coupled to the second optical fiber and/or the radiation guided by the second optical fiber to be coupled to the first optical fiber.

2. The device as claimed in claim 1, wherein each coupling tubular feature $i \in [1, N]$ has a coupling thickness $t_{cp,i}$ and a coupling index $n_{cp,i}$ such that $$t_{cp,i} \in \left[ \frac{100}{101} \frac{m(i)}{2} \frac{\lambda_{op}}{\sqrt{n_{cp,i}^2 - 1}}, \frac{100}{99} \frac{m(1)}{2} \frac{\lambda_{op}}{\sqrt{n_{cp,i}^2 - 1}} \right],$$

with $m \in \mathbb{N}^*$.

3. The device as claimed in claim 1, wherein the coupling tubular features are arranged so that a distance $(D_{12})$ between the center of a coupling tubular feature and an adjacent coupling tubular feature is less than said wavelength $\lambda_{op}$.

4. The device as claimed in claim 1, wherein said coupling element comprises at least a first (MCP1) and a second (MCP2) coupling tubular feature.

5. The device as claimed in claim 4, wherein the plurality of first and second confining tubular features partially encircle said first and second cores, respectively, said first coupling tubular feature (MCP1) being arranged within the first optical fiber, facing a segment of the first core that is not encircled by the plurality of first confining tubular features, said second coupling tubular feature (MCP2) being arranged within the second optical fiber facing a segment of the second core that is not encircled by the plurality of second confining tubular features, the first and second coupling tubular features being arranged facing each other.

6. The device as claimed in claim 4, wherein the plurality of first and second confining tubular features completely encircle the first and second cores, respectively, said first and second coupling tubular features (MCP1, MCP2) are nested in one of said first and second confining tubular features, respectively, and the first and second coupling tubular features are arranged facing each other.

7. The device as claimed in claim 4, wherein said first coupling tubular feature (MCP1) is arranged within the first optical fiber, facing a segment of the first core that is not encircled by the plurality of first confining tubular features, and wherein the plurality of second confining tubular features completely encircles the second core, said second coupling tubular feature (MCP2) being nested in one of said second confining tubular features and arranged opposite said first coupling tubular feature.

8. The device as claimed in claim 4, wherein the coupling element comprises at least one additional tubular feature (MTa) forming one of the coupling tubular features, which feature is arranged between the first and second coupling tubular features.

9. The device as claimed in claim 1, wherein said coupling element comprises a single coupling tubular feature (MCP).

10. The device as claimed in claim 9, wherein the coupling tubular feature (MCP) is arranged facing a segment of the first core that is not encircled by the plurality of first confining tubular features and facing a segment of the second core that is not encircled by the plurality of first confining tubular features, said tubular feature being placed substantially between said segments.

11. The device as claimed in claim 9, wherein the plurality of first confining tubular features completely encircles the first core and the plurality of second confining tubular features partially encircles the second core, said coupling tubular feature (MCP) being arranged within the second optical fiber, facing a segment of the second core that is not encircled by the plurality of second confining tubular features, an azimuthal orientation of the first and second optical fibers within the device being configured to maximize an overlap of said leakage channel with a leakage profile of said first microstructured cladding.

12. The device as claimed in claim 1, wherein the coupling thickness or thicknesses $t_{cp}$ and the coupling index or indices nep are configured so that said radiation is guided from the first optical fiber to the second optical fiber by exciting a spatial mode different from a spatial mode of said radiation guided by said first optical fiber.

\* \* \* \* \*